3,145,735
VARIABLY PROPORTIONING AND VARIABLY METERING PLURAL-LIQUID VALVED DISPENSING UNITS
Leonard Osrow, Great Neck, and Harold Osrow, Roslyn Heights, N.Y., assignors to Osrow Products Company, Inc., Glen Cove, N.Y.
Filed Dec. 20, 1960, Ser. No. 77,202
24 Claims. (Cl. 137—604)

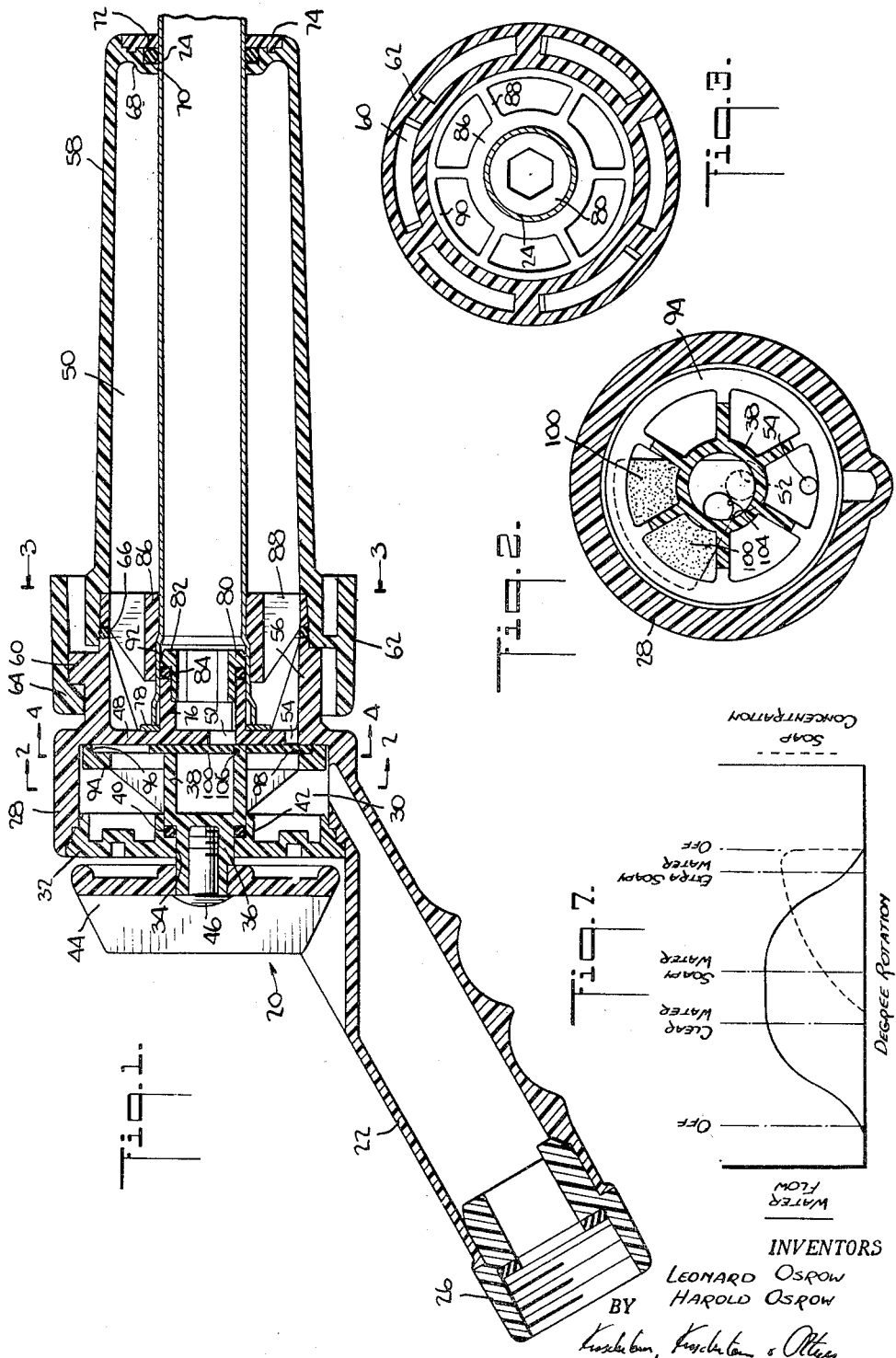

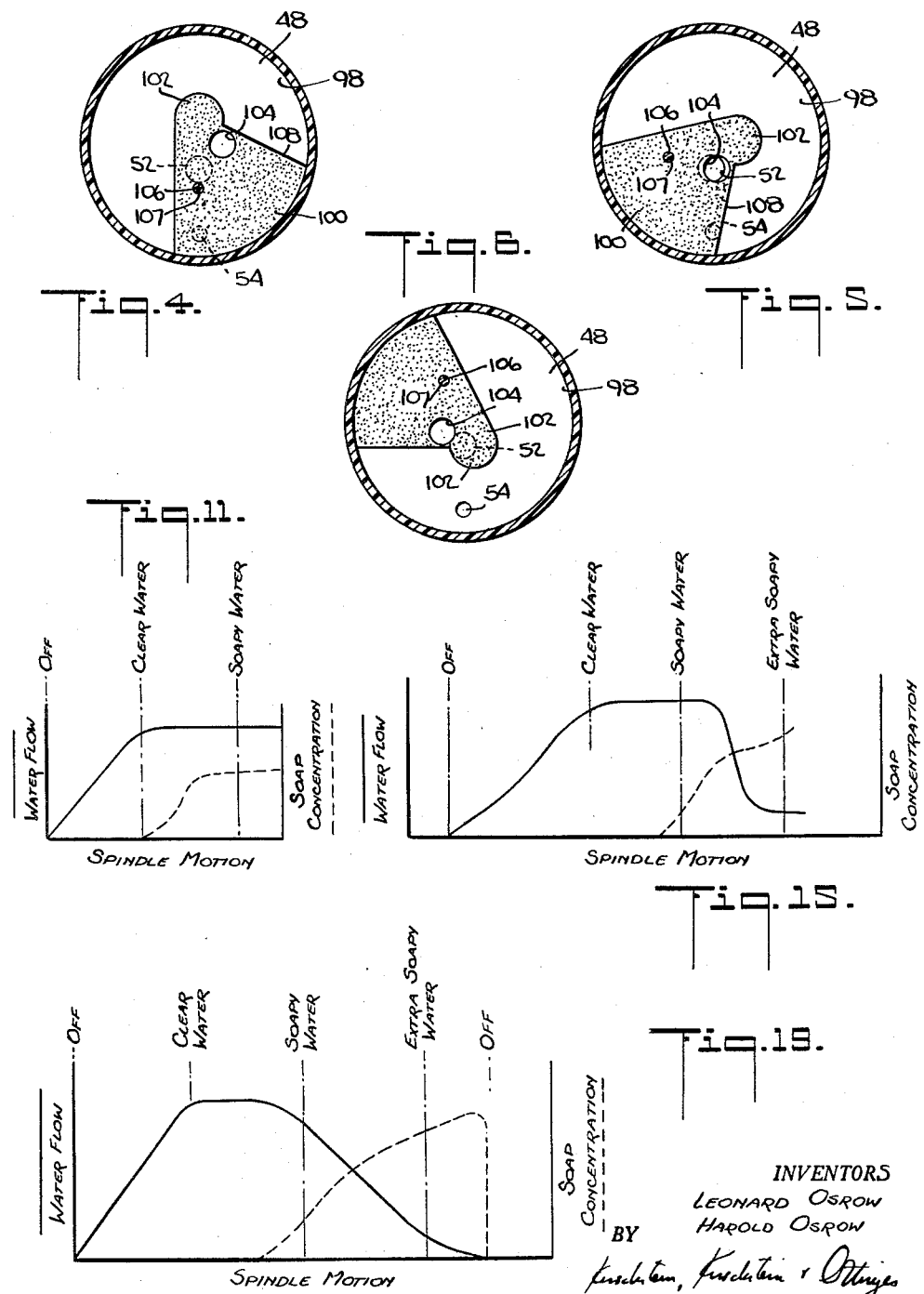

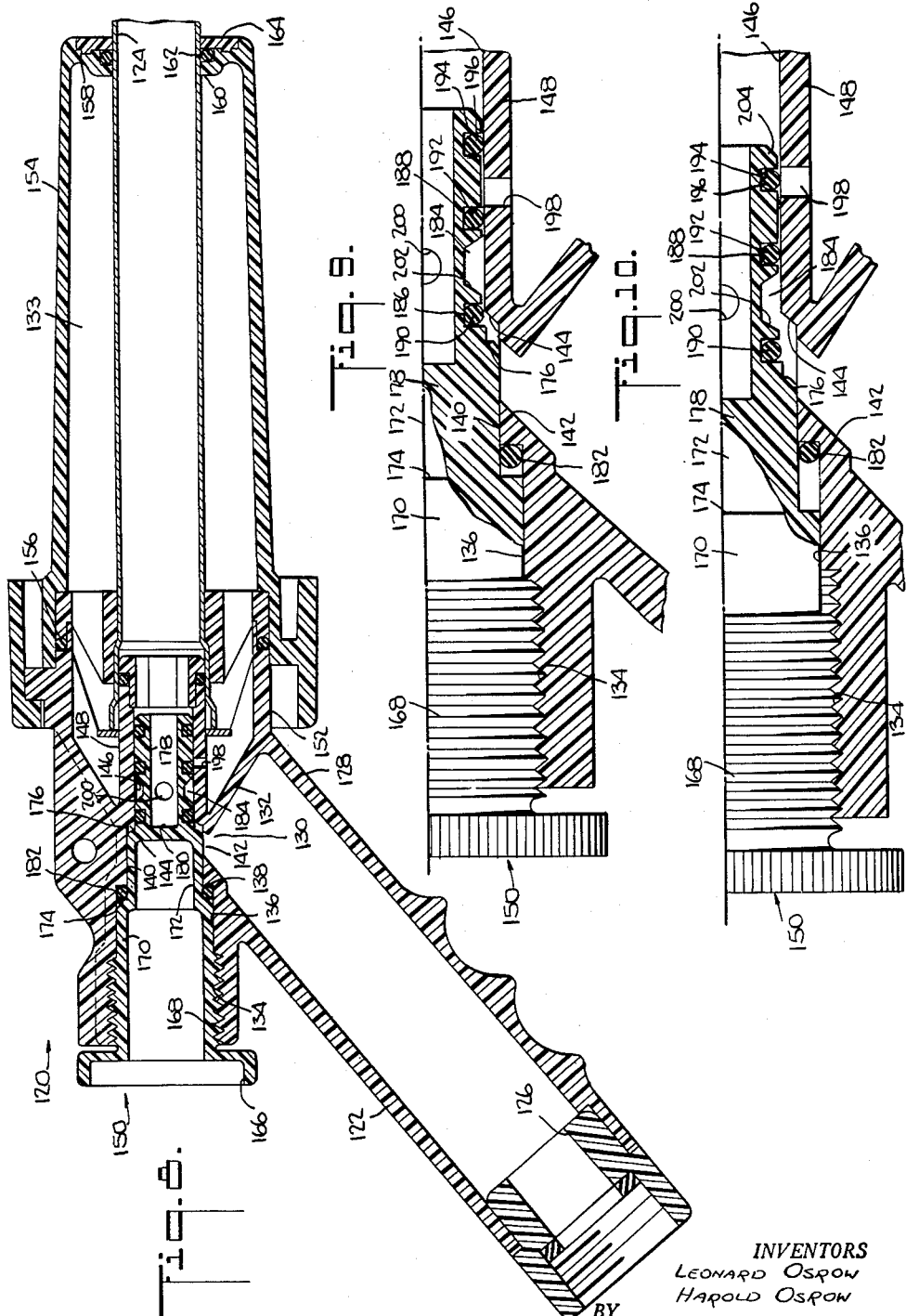

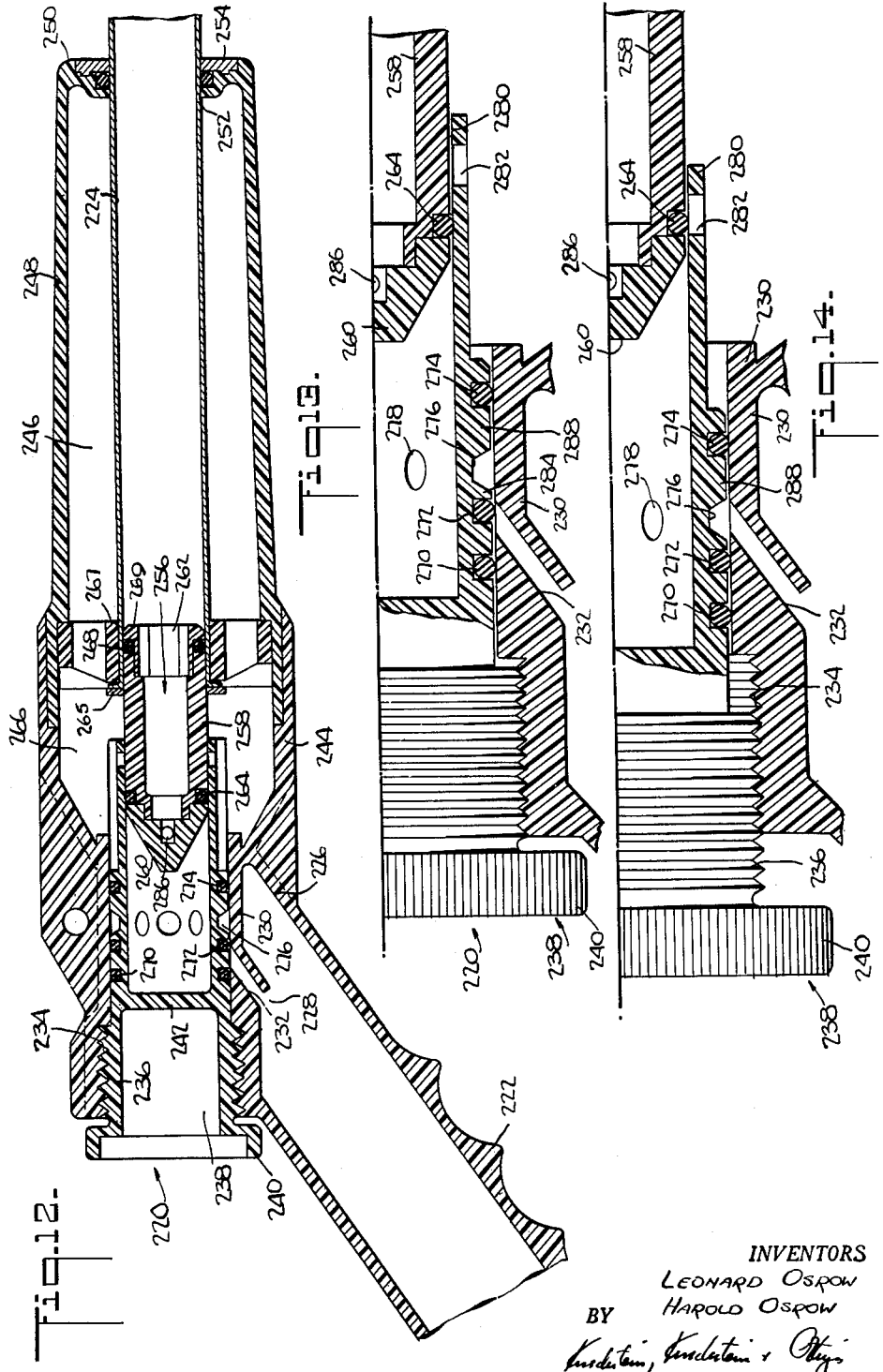

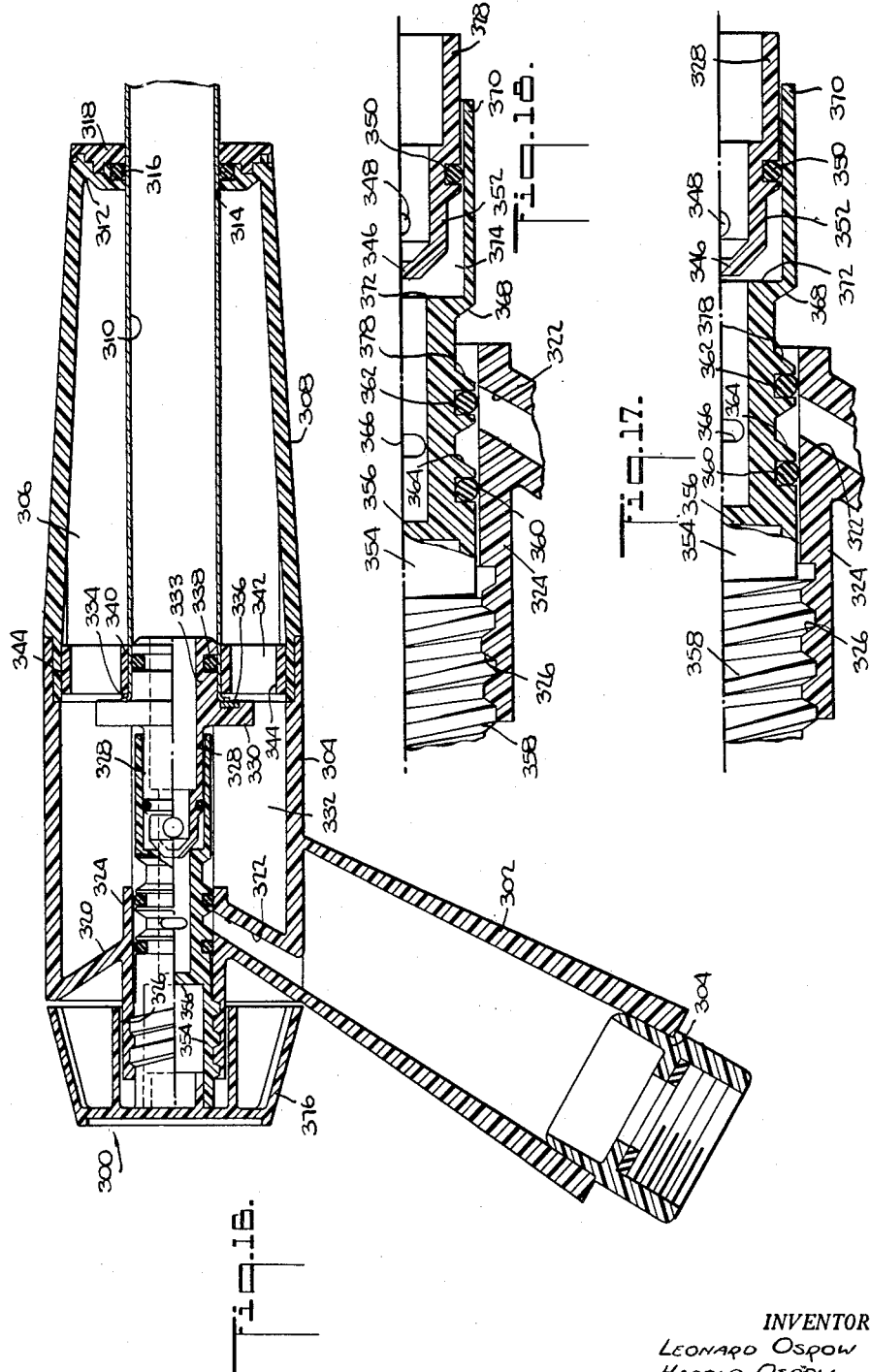

This invention relates to variably proportioning and variably metering plural-liquid valved dispensing units.

By way of example we have shown our invention herein as specifically embodied in dispensing units which are connected to a water line and which are designed for the express purpose of controlling the flow of water as a primary liquid and for controlling the rate of introduction of a liquid detergent as the secondary liquid into the water whereby the units provide flow of clear water at a controllable rate and flow of soapy water which is controllable both as to rate of flow and degree of soapiness; however it is to be understood that our invention is not to be limited to this specific utiliztion except to the extent indicated in the appended claims inasmuch as, although it is not usually practicable to employ anything but water for the primary liquid, we readily can employ secondary liquids other than detergents, for example, liquid insecticides, liquid fertilizers, liquid-borne powders, etc.

In our earlier patents, to wit, United States Letters Patent Nos. 2,717,176, 2,829,921 and 2,828,922 we have shown and described various dispensing units which are designed to inject at will, a secondary liquid into a primary liquid. These units have proved to be extremely practical, easy to use, simple, inexpensive and highly acceptable to the general public. Nevertheless, despite such popularity they have certain drawbacks in that they do not provide several functions that are highly desirable in dispensing units and which heretofore only could be obtained by a rather complex arrangement of valves. For instance, in some of the previous units to which allusion has been made there was no provision for regulating or cutting off the flow of primary liquid and for this purpose an additional valve had to be connected to be manipulated independently of the unit.

Other previous units provided a water cutoff but for this purpose required an arrangement that was difficult to make on a commercial basis. Other units provided different rates for the introduction of a liquid detergent but there was no continuous variation from one rate to another, nor was there a continuous variation in the rate of introduction of the detergent into the water.

None of the previous units provided a single control to regulate the flow of clear water from cutoff to maximum and with the same control to regulate the introduction of the second liquid into the water. Nor were any of the previous dispensing units so constructed that the introduction of the second liquid could be accompanied by a reduction in the flow of water so as to produce a high concentration of the second liquid in a comparatively restricted flow of water, this being particularly desirable under many conditions.

Nor did any previous dispensing units furnish a mechanism which enabled the flow of the clear water and the secondary liquid to be varied finely i.e. by fine graduations. Rather, in these old units, change-over from one rate to another was sudden and often not well controlled.

In addition, in previous units, care had to be exercised not to disturb the setting of the controls and yet these controls were so positioned on the dispensing units, and were of such a large size that persons handling the units, would, unless care was exerted, accidentally change the setting of the controls.

Furthermore in such previous units the water volume control and shut off were effected at the hose coupling where it was difficult to manipulate and where leakage inherently persisted because the coupling had to be left slightly loose.

It is an object of our present invention to provide dispensing units which avoid all of the foregoing drawbacks and which are, nevertheless, practical, simple, easy to use and inexpensive.

It is another object of our invention to provide dispensing units of the character described which provide a single control that by movement between extremes is able to regulate the flow of both primary and secondary liquids and the rate of their mixing.

It is another object of our invention to provide dispensing units of the character described which can vary the rate of flow of the primary liquid from cutoff to maximum and can vary the rate of flow of the secondary liquid in a like manner with a single control.

It is another object of our invention to provide dispensing units of the character described which can vary the rate of flow of the primary liquid from cutoff through maximum to a reduced rate of flow and with the same control, vary the rate of introduction of the secondary liquid whereby the secondary liquid can achieve a maximum rate of flow when the primary liquid has a reduced rate of flow and thus create a relatively high concentration of the secondary liquid in a slow flow of the primary liquid. This arrangement is of value under certain conditions, for instance, where it is desired to apply a particularly soapy solution to a stubborn spot of dirt on a car or a particular strong solution of insecticide to a badly diseased tree, it being necessary at such time to maintain the flow of primary liquid, albeit at a low rate, since an undiluted flow of the secondary liquid would be useless or harmful.

It is another object of our invention to provide dispensing units of the character described which provide a single valve to regulate the flow of both the primary and secondary liquids whereby the number of parts is maintained at a minimum so that the manufacturing expense is kept low.

It is another object of our invention to provide dispensing units of the character described which, with a single valve, can control the rate of flow of the primary liquid from cutoff to maximum back to cutoff with a continuous movement of the valve and with this same movement will vary the flow of the secondary liquid from cutoff to maximum back substantially to cutoff, thus adding to the advantages of a concentrated mixture of secondary and primary liquid the further advantage of cutoff at both ends of movement of the control so as to simplify operation of the unit.

It is another object of our invention to provide dispensing units of the character described which are particularly simple to load with the secondary liquid.

It is another object of our invention to provide dispensing units of the character described in which the control means can be readily removed when desired and which when removed will leave a filling opening for the secondary liquid.

It is another object of our invention to provide dispensing units of the character described in which the control is mounted on a body for movement relative thereto so that the body may be physically handled to direct the exit flow of the mixed liquids without fear of disturbing the setting of the control.

It is another object of our invention to provide dispensing units of the character described in which, while maintaining extreme simplicity of structure, the control member is so mounted on the body as to provide a fine degree of variation in the setting of the control whereby small differences either in the rate of flow of the primary liquid or in the proportioning of two liquids are easy to achieve.

It is another object of our invention to provide dispensing units of the character described which are neat and attractive in appearance and yet compact and rugged in operation.

It is another object of our invention to provide dispensing units of the character described which lend themselves to mass production methods such, for example, as injection molding.

It is yet another object of our invention to provide dispensing units of the character described which, despite their comparative complexity of function, will, at low cost, prevent any inadvertant mixing or dilution of the two liquids.

It is another object of our invention to provide dispensing units of the character described which are quite simple to manipulate, i.e. to enable a user to direct the mixed streams of liquids wherever desired.

It is another object of our invention to provide dispensing units of the character described which can be assembled quickly and easily by comparatively unskilled help.

Other objects of our invention in part will be obvious and in part will be pointed out hereinafter.

Our invention accordingly consists in the features of construction, combinations of elements, and arrangements of parts which will be exemplified in the dispensing units hereinafter described, and of which the scope of application will be indicated in the appended claims.

In the accompanying drawings, in which we have shown various possible embodiments of our invention, FIG. 1 is a longitudinal central sectional view through a dispensing unit constructed in accordance with our invention;

FIGS. 2 and 3 are transverse sectional views taken substantially along the lines 2—2 and 3—3, respectively, of FIG. 1;

FIG. 4 is a sectional view taken substantially along the line 4—4 of FIG. 1, the same illustrating the position of the single valve when both the water and liquid detergent are cut off;

FIG. 5 is a view similar to FIG. 4, but showing the position of the single valve when the flow of water is almost at a maximum and just prior to start of the introduction of the liquid detergent;

FIG. 6 is a view similar to FIG. 4, but showing the position of the single valve at the opposite extreme of its movement when the flow of water just has been cut off and therefore further introduction of the liquid detergent has been inhibited;

FIG. 7 is a flow chart showing the rates of water flow and of introduction of the liquid detergent into the water, said rate being plotted as a function of the angular position of the control member;

FIG. 8 is a view similar to FIG. 1 of a dispensing unit embodying a modified form of our invention in which the control valve experiences axial movement rather than pure rotational movement as shown in FIG. 1;

FIG. 9 is an enlarged sectional view of the valve spindle and valve body shown in FIG. 8 and illustrating said spindle and body in the relative positions thereof at which the flow of water first is initiated, the relative positions shown in FIG. 8 being such that the flow of water and introduction of liquid detergent are completely cut off;

FIG. 10 is a view similar to FIG. 9, but illustrating a changed relative position of the valve spindle and valve body at which the flow of water is substantially at a maximum and the introduction of the liquid detergent has just commenced;

FIG. 11 is a flow chart showing the rates of water flow and of introduction of the liquid detergent into the water for the dispensing unit shown in FIG. 8, said rates being plotted as a function of the linear position of the valve spindle;

FIG. 12 is a view similar to FIG. 8 of another dispensing unit embodying a modified form of our invention but differing from the form of our invention shown in FIG. 8 in certain respects, notably the ability to introduce the liquid detergent through the opening left by removal of the valve, the valve spindle and valve body being shown in relative positions which cut off the flow of water and cut off the introduction of the liquid detergent;

FIG. 13 is an enlarged sectional view of the valve spindle and valve body shown in FIG. 12 and illustrating said spindle and body in the relative positions thereof at which the flow of water first is initiated;

FIG. 14 is a view similar to FIG. 13 but illustrating a changed relative position of the valve spindle and valve body at which the introduction of the liquid detergent has just commenced;

FIG. 15 is a flow chart showing the rates of water flow and of introduction of the liquid detergent into the water for the dispensing unit shown in FIG. 12, said rates being plotted as a function of the linear position of the valve spindle;

FIG. 16 is a view similar to FIG. 12 of another dispensing unit embodying a modified form of our invention but differing from the form of our invention shown in FIG. 12 in certain respects, notably the ability to completely cut off flow of water at both ends of the control movement of the valve spindle;

FIG. 17 is an enlarged sectional view of the valve spindle and valve body shown in FIG. 16 and illustrating said spindle and body in the relative positions thereof at which the flow of water first is initiated;

FIG. 18 is a view similar to FIG. 17 but illustrating a changed relative position of the valve spindle and valve body at which the introduction of the liquid detergent has just commenced; and FIG. 19 is a flow chart showing the rates of water flow and of introduction of the liquid detergent into the water for the dispensing unit shown in FIG. 16, said rates being plotted as a function of the linear position of the valve spindle.

In general we carry out the several objects of our invention by providing a dispensing unit which includes in any one of various forms the following elements, to wit, an inlet chamber for primary liquid, an outlet chamber for primary liquid, a storage chamber for secondary liquid, a first port interconnecting the two primary liquid chambers, a second port connecting the secondary liquid storage chamber with one of the primary liquid chambers and a single valve member for variably blocking said two ports in such a manner that the first port is variably blocked from cutoff to open condition while the second port remains closed and the second port thereafter is variably unblocked, said second port being located either upstream or downstream of the first port. In the various embodiments of our invention soon to be described, different kinds of valve members are used, that is to say a valve member which experiences pure rotation and valve members which operate by virtue of translation although rotatably actuatable. Moreover, in some of these forms of our invention the valve member when proceeding from one position to another merely controllably unblocks the first port whereas in other forms over the same range of movement, it first controllably unblocks the first port and thereafter, while controllably unblocking the second port, rethrottles or completely reblocks the first port. In still another form of our invention the first port is subdivided into two ports one of which is upstream from the other so that both of said first ports can function to control and cut off the flow of the primary liquid.

Referring now in detail to the drawings, and more particularly to FIGS. 1 through 7 in which we have illustrated one of the forms of our present invention, the reference numeral 20 denotes a dispensing unit made in accordance with the principles of this invention.

Said unit 20 includes a handle 22 arranged at an angle, e.g. 30°, to the longitudinal axis of the outflow tubing 24. The handle 22 can be made from any desired material, but preferably is formed of plastic, e.g. by injection molding. Any well-known plastic can be used and preferably one which will withstand shock, such for instance, as a high impact plastic. A synthetic plastic suitable for the purpose is polystyrene modified with Buna-S, typically about 20% Buna-S being present.

The handle is hollow and has an open admission end in which there is disposed a hose coupling ferrule 26 which is internally threaded or otherwise suitably constructed for coupling to a water connection such for instance as a male threaded hose nipple. The ferrule 26 is fixed in any desirable manner to the handle 22, for instance by autogenous welding or by adhesive.

At its upper end the handle 22 is in one piece with a hollow valve body 28. The valve body includes a circular primary liquid (water) inlet chamber 30 the rear end of which is left open in the molding process and is closed by a back plate 32 secured as by welding or cementing to the inlet chamber so as to close the same. An opening 34 is centrally formed in the back plate 32 for rotational reception therein of the hub 36 of a valve spindle 38. The opening 34 is closed against leakage of water between its walls and the hub 36 by an O-ring 40 of rubber or synthetic rubber which seals the space between the hub and an annular flange 42 integral with the plate 32 and concentrically disposed about the hub. The O-ring frictionally engages both the internal surface of the annular flange and the external surface of the hub and, as is well known, will prevent passage of water through the boundaries of such engagement.

A manually manipulatable member, such as a handle 44, is secured to the hub 36 for rotation therewith, as by means of a screw 46. The handle 44 and back plate 32 preferably are made from the same plastic as that used in the manufacture of the handle 22.

The valve body 28 further includes a transverse partition 48 which separates the primary liquid inlet chamber 30 from a secondary liquid (liquid detergent) storage chamber 50. The partition is imperforate with two exceptions, to wit, a primary liquid opening or port 52 and a secondary liquid opening or port 54. Both of these openings are eccentric with respect to the axis of rotation of the handle 44 and of the valve spindle 38. Desirably, although not necessarily, the ports 52, 54 for the primary and secondary liquids are approximately coradial. It will be appreciated as this description proceeds that this arrangement of the ports is simply one of convenience and not one of necessity.

The secondary liquid storage chamber 50 is in part formed by a skirt 56 concentric with the axis of rotation of the valve spindle 38 and integrally extending away from the partition 48 and valve body 28 on the opposite side thereof from the primary liquid inlet chamber 30. The skirt 56 forms one section of the secondary liquid storage chamber, the other section of said chamber being constituted by a tubular shell 58 which is arranged concentrically with the skirt 56 and suitably detachably secured thereto. Such detachable securement can be achieved in any desirable fashion, as for example by mutually forming the skirt 56 and shell 58 with threads that are arranged to be intermeshed; however we have, in this form of our invention, elected to use an easier and quicker coupling means, to wit, a bayonet coupling. Said coupling comprises a series of flanges 60 protruding outwardly from the skirt 56 and conjointly covering almost 180°. Several flanges are provided, for example, three, each covering slightly less than 45°, adjacent flanges being mutually spaced apart by gaps that cover slightly more than 45° each. The other half of the bayonet coupling comprises a sleeve 62 in one piece with the shell 58 and adapted to partially encircle the skirt 56. Said sleeve 62 is provided with inturned flanges 64 that are shaped to complementally match the flanges 60. Thus if there are four 45° flanges 60 we provide four 45° flanges 64.

To couple the shell 58 to the skirt 56 the flanges 64 are slid through the gaps between the flanges 60 and the shell then is turned about 45° so that the flanges overlap one another. The juxtaposed surfaces of the flanges are circumferentially sloped so that the turning action draws the sleeve 58 toward the skirt 56. An O-ring 66 is interposed between the skirt and sleeve and is squeezed as the skirt and sleeve are intercoupled so that the O-ring will be under axial compression and thereby prevent escape of the secondary liquid from the storage chamber 50.

The front end of the shell 58, remote from the skirt 56, is formed with a transverse closure partition 68 having a central opening 70 to pass the outflow tubing 24. To prevent escape of liquid detergent through this opening 70 we seal the same with an O-ring 72 held in place by a keeper plate 74 that is secured, as by welding or by gluing, to the shell. Said shell and keeper plate preferably are made from the same material as the handle 22. The out-flow tubing desirably is made from light-walled metal conduit, preferably aluminum.

On the side of the partition 48 opposite to the primary liquid inlet chamber 30 we provide a nipple 76 integral with the partition and in the shape of a tubular flange. Said nipple constitutes the primary liquid outlet chamber and is connected to the primary liquid inlet chamber by the primary liquid port 52 extending through the partition 48. The nipple 76 is concentric with the axis of rotation of the valve spindle 38 so that the port 52 is eccentric with respect to the axis of said nipple.

The rear end of the outflow tubing 24 is coupled to and journalled on the open front end of the primary liquid outlet chamber 76 so as to provide a rotatable support for and passageway leading to the tubing. The rear rim of the tubing rests upon a flat metal washer 78 seated against the downstream side of the partition 48, the term "downstream" being with respect to the direction of the flow of primary liquid entering through the handle 22. The front end of the primary liquid chamber 76 is provided with an extension cap 80 of the same material as the handle 22 and autogenously welded or cemented to the chamber 76. The cap includes a mushroom head 82 forming a space between the end of the chamber 76 and the head in which there is received an O-ring 84 that presses against the outer surface of the chamber and the cap 80, and the interior surface of the outflow tubing 24, thereby preventing at this point any connection between the primary liquid streaming through the outflow tubing and the secondary liquid within the storage chamber 50. However it will be seen that this does not interfere with the relative rotation between said tubing 24 and the storage chamber.

The outflow tubing further is rotatably held in place at its rear end by a tubular journal 86 carried on spider arms 88 that extend inwardly from a rim 90 functionally integral with the secondary liquid storage chamber 50. Said journal is formed with a socket 92 which receives the belled rear end of the outflow tubing whereby to prevent outward movement of said tubing. Inward movement of said tubing is prevented by abutment of the rear end of said tubing against the washer 78 so that the tubing is captively held against axial movement within the storage chamber. This does not, as indicated heretofore, interfere with rotational movement of the outflow tubing relative to the storage chamber and dispensing unit.

It will be appreciated that the dispensing unit as thus far described essentially comprises a primary liquid inlet chamber 30 separated from a secondary liquid storage chamber 50 by a transverse partition 48 which is perforated by a second port 54 to provide a connection between the two chambers, the partition further being perforated by a first port 52 which solely connects the primary liquid inlet chamber 30 to the primary liquid outlet chamber 76. Pursuant to our invention both of these ports are controlled by a single valve.

The valve spindle 38 carries at its front end a perforated plate-like support 94 having a stub peripheral flange 96 facing the partition 48 and defining a shallow disc-like space 98. Within this space we provide a valve plate 100 which is made from an elastomeric material such as natural or synthetic rubber and which will therefore, when held against a surface, prevent flow of water at the interface between the rubber and the surface.

The shape of the valve plate is best shown in FIGS. 2 and 4–6 where it will be seen to be substantially of the contour of a segment of a circle extending inwardly from the periphery of the disc-like space 98 to and across the center of said space and being provided with a lobe 102 at the opposite side of the center. The valve plate is formed with two openings, 104, 106. The opening 104 is located eccentrically with respect to the axis of rotation of the valve spindle 38 and is so positioned that when said valve spindle is turned said opening 104 can be swung into registration with the eccentrically located first port 52 in the transverse partition 48. The opening 106 is a drive or coupling opening which is designed to operatively connect the valve plate to the valve spindle for movement therewith. Said opening 106 receives a nub 107 projecting forwardly from the front end of the valve spindle and substantially filling this opening whereby the plate will turn with the valve spindle.

The operation of the dispensing unit 20 can best be understood by referring to FIGS. 4–6 in which different relative working positions of the valve plate 100 and valve body 28 are shown. In the positions shown in FIG. 4 the valve plate 100 covers the first port 52 which interconnects the primary liquid inlet and outlet chambers and also covers the second port 54 which interconnects the primary liquid inlet chamber and the secondary liquid storage chamber. That is to say, the imperforate portion of said valve plate fully covers these openings; therefore no primary liquid can pass from the inlet chamber 30 to the outflow tubing 24 so that no primary liquid will leave the device, i.e. the primary liquid is cut off and, moreover, no secondary liquid can flow through said second port to enter the stream of primary liquid. This position corresponds to the off point at the left of the graph shown in FIG. 7.

Now if the valve plate 100 is turned in a clockwise direction, as viewed in FIG. 4, the opening 104 will, after a few degrees of rotation start to overlap (eclipse) the first port 52. As this overlapping is first initiated a small clear unblocked aperture will be provided for flow of the primary liquid through the transverse partition 48. As the valve plate 100 is turned still further in the same direction the unblocked aperture will enlarge and more primary liquid will stream from the handle 22 to the outflow tubing 24. This increase in flow of the undiluted primary liquid is indicated by the rising solid line on the graph in FIG. 7 as a function of increasing degree of rotation of the valve spindle 38.

Ultimately a position will be reached such as shown in FIG. 5 in which a substantially full, i.e. maximum, flow of undiluted primary liquid will be taking place through the first port 52 in the partition. This position is indicated at the point marked "clear water" in FIG. 5. At about the same position the trailing edge 108 of the valve plate 100 has almost reached the second port 54, this too being shown in FIG. 5. A few more degrees of rotation of the valve plate 100 will start to expose the second port 54. As said second port is exposed it will permit the secondary liquid to be dispensed from the storage chamber 50 into the primary liquid now freely flowing through the inlet chamber 30 and into the outlet chamber 76 and outflow tubing 24.

Mention should be made of the particular manner in which the secondary liquid is introduced from the storage chamber into the moving stream of primary liquid. It will be observed that only a single second port is provided for communication between the moving primary liquid and the storage chamber; that is to say, the moving primary liquid passes over a port which exposes the interior of the storage chamber. The primary liquid does not enter this second port, pass through a part of the storage chamber and then flow out through another port downstream of the second port; rather due to variations that always are occurring in the pressure of the primary liquid flowing past the second port 54 there is a pulsing of the primary liquid into and out of the storage chamber through the second port 54, the primary liquid picking up (becoming diluted with) some of the secondary liquid each time that a wave of primary liquid enters the storage chamber and transmitting this secondary liquid into the main stream of primary liquid as the primary liquid leaves the storage chamber. This arrangement requires an effectively singular opening between the stream of primary liquid and the storage chamber. By the term "singular" as used herein we mean to denote one second port or a series of second ports at about the same pressure of primary liquid, i.e. located at about the same point in the stream so that the primary liquid will not be so confined or directed as to flow in the second port and out through another port. For example, if there are a series of second ports 54 in the partition 48 which are successively exposed by movement of the valve plate 100 so as to continuously increase the effective area of communication between the storage chamber and the inlet chamber these would be jointly considered as a single second port, broken down into several second ports for design and strength.

As indicated above, a few degrees past the FIG. 5 position, a very small area of communication is provided between the primary liquid inlet chamber and the storage chamber so that in such position only a slight amount of the secondary liquid will be introduced into the main stream of primary liquid. By progressively rotating the valve plate 100, more and more of the second port 54 will be exposed so that progressively greater amounts of the secondary liquid will be introduced into the primary liquid stream as indicated by the rising dotted line showing the concentration of secondary liquid in the graph of FIG. 7.

During the initial portion of the rise of secondary liquid concentration, i.e. gradual increase of exposure of the second port 54, the flow of primary liquid through the first port 52 remains approximately constant; but before the trailing edge 108 of the valve plate 100 fully exposes the second port 54 the primary port 52 will start to be covered by the lobe 102 on the valve plate which begins to restrict the flow of primary liquid.

As the valve plate 100 is turned further in a clockwise direction the flow of primary liquid will be progressively decreased due to increased encroachment of the lobe 102 over the first port 52, this being indicated by the falling portion of the solid line curve of the primary liquid volume as indicated in the graph of FIG. 7. Because the amount of secondary liquid is either increasing or holding constant or decreasing at a lesser rate than flow rate of the primary liquid and because the primary liquid flow is decreasing, the concentration of secondary liquid increases so that under the control of the operator by means of a single valve the concentration of secondary liquid can become quite high with barely a trickle of primary liquid leaving the outflow tubing 24. This setting is particularly advantageous for applying high concentrations of insecticide, fungicide or fertilizer or for providing high concentration of detergents for scrubbing a particularly dirty spot on an object to be cleaned.

Further movement of the valve plate will completely cut off flow of primary liquid as indicated in FIG. 6. This is represented by the terminal point for the primary liquid volume in FIG. 7. At the same time, because no secondary liquid flow is educed from the storage reservoir unless there is a flow of primary liquid past the second port, the concentration of secondary liquid in the primary liquid outflow falls to zero.

We thus have provided a dispensing unit 20 which by a single rotatable control can (1) regulate the flow of water (primary liquid) from cutoff to a large amount of clear water, (2) can then introduce a detergent or other secondary liquid into the water in increasing amounts and (3) thereupon can substantially reduce the flow of water, to cut off if desired, and at the same time increase the concentration of the secondary liquid which is introduced into the water.

We also wish to mention that in the particular dispensing unit 20 just described the secondary liquid is introduced into the moving stream of primary liquid at a point upstream of the first port through which the volume of flow of the primary liquid is regulated. However, as will be appreciated from other forms of our invention soon to be described, this arrangement merely is one of convenience since the second (secondary liquid) dispensing port will function equally well when it is downstream of the controllable water opening (first port).

The dispensing unit 20 functions quite satisfactorily. However it has certain limitations which under certain circumstances may be undesirable. For instance, the entire control of primary and secondary liquids must take place with a valve movement of less than 360° providing a somewhat fine regulation that is somewhat difficult to govern manually. Also movement of a valve plate such as the elastomeric plate 100 over primary liquid and secondary liquid control ports does not always provide a seal which is as efficient as might be desired. Furthermore, assembly of the valve plate and valve spindle requires some manipulative skill and in the event of deterioration of the valve plate 100, it is difficult to replace the same. All of these possible disadvantages are overcome by the use of the dispensing unit 120 shown in FIGS. 8–10 and operable in accordance with the graph shown in FIG. 11.

The dispensing unit 120 like the dispensing unit 20 preferably is fabricated by molding, desirably by injection molding, as with a synthetic thermoplastic, e.g. a high impact plastic. Said dispensing unit 120 comprises a hollow handle 122 arranged at an angle of about 30° to the longitudinal axis of the aluminum outflow tubing 124. The admission end of the handle is open and has disposed therein an internally threaded hose coupling ferrule 126 which is fixed to the handle as by autogenous welding or by adhesive. At its upper end the handle 122 is in one piece with a hollow valve body 128 with which the passageway of the handle connects. The valve body includes a primary liquid inlet chamber 130 the front end of which is formed by a wall 132 constituting the rear wall of a secondary liquid storage chamber 133.

The valve body 128 is shaped to include an elongated bore which consists of several sections arranged in axial-sequence. The rearmost bore section, indicated by the reference numeral 134, is internally threaded and leads into a concentric cylindrical bore section 136 that terminates at an inward shoulder 138. The reference numeral 140 denotes the next forward bore section which is concentric with the sections 134, 136 and comprises an extension of the primary liquid inlet chamber.

An opening 142 connects these two parts of the primary liquid inlet chamber. The bore section 140 terminates at a sloping shoulder 144 which constitutes the first port, i.e. the port which is utilized to control the flow of primary liquid.

The most forward bore section 146 runs forwardly from the shoulder 144 and is concentric with the bore sections 134, 136 and 140. It forms part of the primary liquid outlet chamber. The cylindrical bore section 146 is defined by the inner surface of a sleeve 148 that protrudes forwardly from the wall 132 into the secondary liquid storage chamber 133. The four bore sections 134, 136, 140 and 146 form a valve cage in which there is rotatably and slidably received a valve spindle 150.

The secondary liquid storage chamber 133 is formed in part by a skirt 152 concentric with the sleeve 148 and integrally extending away from the outer periphery of the frusto-conical wall 132. Said skirt 152 comprises one section of the storage chamber 133 the other section of which is constituted by a tubular shell 154 arranged concentrically with the skirt 152 and suitably detachably secured thereto. For example, the attachment may be of the same type as that described with respect to the dispensing unit 20. Thus the detachable securing means conveniently comprises a bayonet coupling with on O-ring 156 preventing escape of secondary liquid from the chamber 133. The end of the shell 154 remote from the skirt 152 is formed with a transverse wall 158 having a central opening 160 to pass the outflow tubing 124. Said opening is sealed to the outflow tubing, as by an O-ring 162 held in place by a keeper 164. The outflow tubing desirably is made from light walled metal conduit, preferably aluminum. The rear end of the outflow tubing is rotatably captively held within the storage chamber 133 in substantially the same manner as described with respect to the dispensing unit 20 and therefore will not be again detailed. It suffices to say that the connection is such as to prevent axial movement of the outflow tubing 124 and also to prevent any liquid communication between the interior of said tubing and the interior of the storage chamber 133 except by manipulation of the valve spindle 150.

The valve spindle is so mounted in the valve cage as to permit rotational movement thereof and to accompany such rotational movement by an axial movement. To this end the valve spindle includes a manipulation knob 166 as well as a male threaded shank 168 which meshes with the female threads in the rearmost bore section 134. Thereby rotation of the valve spindle will cause said spindle to axially progress either forwardly or rearwardly in the valve cage.

In front of the shank 168 we form the valve spindle with a tubular collar 170 which is a free sliding fit in the bore section 136, the fit being such simply as to enable the spindle to move freely within the bore. At its forward end the collar 170 is connected to an intermediate collar 172 by a shoulder 174. The intermediate collar slides in the bore section 140 and is connected by a shoulder 176 to a hollow cylindrical valve 178 the forward end of which is open. The rear end of the valve 178 is closed by a transverse partition 180. The interior of said valve also forms part of the primary liquid outlet chamber.

An O-ring 182 frictionally encircles the intermediate collar 172 to prevent rearward egress of primary liquid entering the bore section 140 through the opening 142.

The valve 178 is externally provided with an annular groove 184 for the passage of primary liquid in the water outlet chamber. On both sides of the groove 184 we form annular grooves 186, 188 in which there are located sealing O-rings 190, 192. Another groove 194 is provided near the forward end of the valve 178, this latter groove having fitted therein a sealing O-ring 196. These three O-rings 190, 192, 196 in association with ports one of which includes the first port 144 control the flow of primary liquid, i.e. water, and secondary liquid, i.e. the liquid in the storage chamber 133. A second port 198 is formed in the sleeve 148 the same providing a passageway that communicates between the storage chamber 133 and the front section 146 of the valve cage this latter being a part of the outlet chamber and the section in which the valve 178 is operative. One or more through openings 200 connect the interior bore of the valve with the annular groove 184 thus providing a permanent passageway between the different parts of the outlet chamber which function as a unit.

The relative positions of the various sealing rings and the two ports can best be described by referring to the operation of the dispensing unit 120.

In the closed or inoperative position of the dispensing unit the valve spindle 150 is turned to shift the same to its foremost location, this being the one illustrated in FIG. 8 in which the male threaded shank 168 is screwed home in the female threaded bore 134. At this time the O-ring 190 closes the port 144 thus preventing flow of primary liquid from the inlet chamber bore section 140 into the outlet chamber bore section 146 so that no primary liquid can reach the annular passageway 180, flow through the openings 200 and then through the front of the open bore in the valve 178 into the outflow tubing 124.

In this position of the valve spindle 150 the sealing ring 192 is located rearwardly of the second port 198. This sealing ring 192 serves to prevent flow of primary liquid forwardly from the annular water groove 184 and limits such flow of primary liquid into the opening 200. At the same time, that is to say in the closed position of the valve spindle, the sealing ring 196 is located forwardly of the second port 198 so that all communication between the storage chamber 133 and the front bore section 146 (outlet chamber) in which the valve 178 operates is blocked.

Thus neither primary nor secondary liquid can stream through the outflow tubing 124.

If now the knob 166 is rotated to slightly back off the valve spindle to the position indicated in FIG. 9 a limited flow of clear primary liquid will take place from the hollow handle 122 through the opening 142 into the inlet chamber bore section 140 then through the port shoulder 144 which the O-ring 190 now barely clears into the annular passageway 184 in the outlet chamber bore section 146. It will be observed that the diameter of the valve 178 is slightly smaller than the diameter of the front bore section 146 of the valve cage so that primary liquid can flow around the annular flange 202 which defines the front of the seating groove 186. Accordingly, the primary liquid entering the groove 184 will reach the outflow tubing 124 so that there now will be a slight flow of clear primary liquid. Nevertheless, the O-ring 196 still, as shown in FIG. 9, blocks the second port 198.

As the valve spindle is shifted further rearwardly by turning the knob 166, the flow of clear primary liquid gradually will increase as indicated by the rising solid line of water volume in the graph of FIG. 11 until a substantially maximum rate of flow of secondary liquid is achieved when the passageway 184 appreciably overlaps the shoulder 144 (first port) sufficiently to allow full flow.

Further rearward axial travel of the spindle 150, as indicated in FIG. 10, shifts the valve 178 back so far that the foremost O-ring 196 starts to clear the second port 198. This provides communication through said second port between the secondary liquid in the storage chamber 133 and the now substantial volume of primary liquid rushing through the valve 178 and bore section 146 (the outlet chamber) to the outflow tubing 124. Such communication takes place around the periphery of the front flange 204 of the seating groove 194. This communication between the primary liquid outlet chamber and the secondary liquid storage chamber permits the pulsations of primary liquid to gradually dispense liquid from the storage chamber 133 into the outflow tubing 124. The beginning of such dispensing action can be seen in relation to the water flow by the dotted line curve of the graph in FIG. 11.

As the spindle 150 is backed off further by additional rotation thereof the area of the second port 198 thus exposed will increase with a consequent increase in flow and concentration of the secondary liquid as indicated by the rising dotted line in FIG. 11. Eventually a position will be reached in which with maximum flow of primary liquid a maximum rate of dispensing of the secondary liquid from the storage chamber 133 will be obtained. This represents the other extreme effective position of the valve spindle (opposite from cut off position). Any further backing off thereof will not increase flow and, indeed, if the valve spindle is backed off too far the threads will become disengaged and the spindle can be pulled out of the valve cage. Such position is useful for replacing the O-rings 182, 190, 192 or 196.

It will be observed that in this form of our invention the secondary liquid is controllably dispensed into the primary liquid by an opening downstream of the first port through which flow of the primary liquid controllably takes place, both said controls being under the regulation of a single knob, handle, or the like. It also will be observed that manipulation of this single control regulates the flow of primary liquid from cutoff to full flow and the late starting flow of the secondary liquid into the primary liquid from cut off to full flow.

The dispensing unit 120, although suitable for most purposes and although having certain advantages over the dispensing unit 20, lacks one function present in the dispensing unit 20, to wit, the single control does not enable the flow of primary liquid to be reduced after the flow of secondary liquid has been commenced so that a highly concentrated proportion of secondary to primary liquid can not be achieved with the dispensing unit 120. Moreover, it will be noted that the dispensing unit 120 requires decoupling of the two parts that constitute the storage chamber 133 for the secondary liquid. We have overcome these minor drawbacks by providing a third form of our invention which is embodied in the dispensing unit 220 shown in FIGS. 12, 13 and 14 and the operation of which is clear from inspection of the graph in FIG. 15.

Said dispensing unit 220 preferably is fabricated by molding, desirably by injection molding as with a synthetic high impact thermoplastic material.

The unit 220 comprises a hollow handle 222 arranged at an angle of about 30° to the longitudinal axis of the aluminum light-wall outflow tubing 224. The admission end of the handle 222 has not been shown since it is identical to the corresponding handle 122 of the dispensing unit 120. At its upper end the handle 222 is in one piece with a hollow valve body 226. The valve body includes an inlet chamber 228 for primary liquid.

Immediately adjacent said inlet chamber and indeed defining a wall thereof, is a tube 230 which constitutes a valve body the interior of which is the upstream part of the outlet chamber for the primary liquid. A first port 232 connects the interior of the tube 230 to the inlet chamber 228.

The rear end of the valve body is enlarged and threaded as at 234 to receive the male threaded end 236 of a hollow valve spindle 238 having an external manually manipulatable knob 240. Said spindle is transversely blocked by an imperforate partition 242.

Integral with the front end of the primary liquid inlet chamber 228 and separated therefrom by the front wall of said inlet chamber and by the tube 230 is a skirt 244 comprising the rear end of a storage chamber 246 for the secondary liquid, e.g. liquid detergent. Said storage chamber 246 is completed by a thimble 248 the rear end of which is joined to the mouth of the skirt 244. The thimble and skirt can be coupled to one another in any manner whatsoever, e.g. detachably, as with meshing screw threads. However, this is merely a convenience for manufacturing since the thimble and skirt can be permanently joined to one another, as by fusion or an adhesive, inasmuch as it is not necessary to decouple the said two parts of the storage chamber for access thereto because we have provided other means for filling the storage chamber. The front end 250 of the thimble 248 is provided with an O-ring-sealed opening 252 to rotatably water-tightly pass the outflow tubing 224, said O-ring being held into place by a restraining plate 254 fast to the front end of the thimble.

In the last described form of our invention, that is to say the dispensing unit 120, the outlet chamber to which the outflow tubing was directly coupled formed a continuous passageway from the first port to said tubing and it was this construction that necessitated the opening of the storage chamber in order to fill the same inasmuch as it was not feasible to introduce secondary liquid into the storage chamber by pouring the secondary liquid through the valve body when the valve spindle was removed. In the present embodiment of our invention, to wit, the dispensing unit 220, the upstream part of the outlet chamber which is the tube 230 does not form a continuous passageway between the first port and the outflow tubing. Instead said outflow tubing 224 is directly coupled to a downstream outlet chamber port 256 formed by an elongated cylindrical sleeve 258 having a head 260 closing its rear end and having an open front end 262. To minimize turbulence in the flow of primary liquid the head 260 may be bullet shaped. For convenience of manufacture the head 260 is made separately from the sleeve 258 and is connected thereto as by fusion or adhesion. The connection is such as to leave a seating slot in which an O-ring 264 is disposed. The sleeve 258 is in one piece with the skirt 244 and handle 208 being connected thereto by radial webs 266 which like said sleeve are located within the storage chamber 246. Said sleeve is separated by a clear space from the tube 230.

The rear end of the outflow tubing 224 has a nice rotatable fit around the front end of the sleeve 258 and is held in place by a hollow hub 267 in which the tubing 224 is rotatable. Leakage from the interior of the outflow tubing to the storage chamber 246 is prevented by an O-ring 268 disposed in a slot formed between the front end of the sleeve 258 and a cap 269 secured to said front end as by fusion or adhesion. The rear end of the tubing 224 rests against a metal washer 265 seated on the front faces of the webs 266, said rear end being flanged out so as to be captively retained between the rear surface of the hub 267 and the front surface of the washer 265. Thus the outflow tubing 224 is locked to the dispensing unit in a fashion such as to prevent axial shifting movement but allow turning movement.

The intermediate part of the outlet chamber for the primary liquid constitutes the interior of the hollow valve spindle 238 forward of the transverse partition 242, that is to say, the primary liquid is adapted to flow from the inlet chamber 228 through the port 232 into the tube 230, and then through the valve spindle into the sleeve 258, these three parts jointly forming the outlet chamber for the primary liquid.

The primary liquid is controlled, i.e. regulated and prevented from leaking, by three O-rings 270, 272, and 274 received in slots on the exterior surface of the valve spindle 238. The rearmost and foremost O-rings 270, 274 are primarily sealing rings, i.e. to prevent leakage; whereas the central O-ring 272 is a control O-ring, which is to say it regulates the rate of flow of primary liquid through the first port 232. Immediately forward of the control O-ring 272 is an annular primary liquid flow passageway 276 which is connected by openings 278 in the valve spindle to the hollow open interior of said spindle forward of the partition 242. The front end 280 of said spindle is open and is a smooth sliding fit on the sleeve 258. Near said front end 280 the valve spindle 238 is provided with an angularly arranged series of second ports 282.

The relative locations of the first and second ports 232, 282 and the control O-rings 264, 272 are best described by reference to the operation of the dispensing unit 220.

The cutoff positions of the parts of said dispensing unit are illustrated in FIG. 12. In this condition of the unit flow of primary liquid through the first port 232 is blocked by the O-rings 270, 272. The O-ring 270 prevents always undesirable rearward flow of the primary liquid and the O-ring 272 prevents forward flow of the primary liquid. This latter flow would lead the primary liquid into the annular passageway 276 which with the tube 230 constitutes the first (upstream) part of the primary liquid outlet chamber and then through the openings 278 into the hollow interior of the spindle 238 which constitutes the intermediate part of the primary liquid outlet chamber.

If now the knob 240 is turned the spindle 238 will back off (move retrogradely). When it reaches the position shown in FIG. 13 the control O-ring 272 begins to unblock the first port 232 so that primary liquid can slowly flow from the inlet chamber 228 through the first port into the first part of the primary liquid outlet chamber which is the annular passageway 276. This flow takes place around the periphery of the forward flange 284 which aids in defining the seating groove for the O-ring 272. Said flange clears the interior surface of the tube 230 sufficiently to permit such flow of primary liquid, although the same is, of course, throttled by passage of the primary liquid through such a narrow annular area. The primary liquid continues its flow from the annular passageway 276 through the openings 278 into the interior of the valve spindle which is the intermediate part of the primary liquid outlet chamber. Then the primary liquid flows through openings 286 in the head 260 of the last part 256 of the primary liquid outlet chamber from whence the primary liquid enters the outflow tubing 224 to be led out of the dispensing unit. It will be observed that at this time the O-ring 264 prevents communication between the flowing primary liquid and the secondary liquid contained in the storage chamber 246.

As the knob continues to be backed off, the throttling effect of the flange 284 and of the O-ring 272 are continuously decreased so that flow of clear primary liquid steadily rises as indicated by the ascending solid line of the graph in FIG. 15.

After a certain degree of spindle motion further backing off of the spindle does not provide a sufficient increase in opening at the first port 232 to materially increase the flow of primary liquid so that the rate of flow substantially levels off as indicated by the dwell in the solid line of the graph shown in FIG. 15.

However, continued rearward movement of the spindle by manipulation of the knob 240 finally brings the secondary liquid control O-ring 264 to the position shown in FIG. 14, where the secondary ports 282 are barely unblocked. It will be understood that the actual motion is of the second ports 282 with respect to the O-ring 264 rather than vice versa. In said FIG. 14 position, therefore, communication is established between the flow of primary liquid in the intermediate part of the primary liquid outlet chamber within the spindle 238 and the storage chamber 246. This communication takes place through the now just barely opened ports 282 and between the interior surface of said spindle and the head 260 so that there is only a slight amount of introduction of secondary liquid into the primary liquid. Said position of the valve spindle is indicated by the start of the dotted line in the graph of FIG. 15.

As the spindle continues to be backed off, the secondary ports 282 are opened wider, thereby providing better communication between the intermediate part of the primary liquid outlet chamber and the storage chamber so that greater amounts of the secondary liquid progressively are introduced into the stream of primary liquid as indicated by the ascending part of the dotted line shown in the graph of FIG. 15.

As the spindle continues to move rearwardly the rear flange 288 which aids in defining the seating groove for the sealing O-ring 274 gradually moves across the first port 232. Inasmuch as this flange 288 does not sealingly engage the interior surface of the tube 230 it permits flow of primary liquid into the annular passageway 276; however the flow is noticeably throttled so that as the spindle moves rearwardly beyond a certain point the flow of the primary liquid first is decreased as indicated by the descending solid line of the graph in FIG. 15 and thereafter levels at a low rate of flow as indicated by the low level solid line shown in FIG. 15.

This descending rate of flow of the primary liquid is accompanied by an increasing rate of introduction of the secondary liquid into the primary liquid so that, as in the case of the dispensing unit 20, as the spindle 238 approaches its other extreme position, the concentration of secondary liquid is high and the rate of flow of the primary liquid is low, this being an arrangement which, as heretofore noted, is desirable for various purposes.

The dispensing unit 220 has a further advantage which will be appreciated if the relative positions of the parts are considered at such times as the flow of primary liquid is cut off at the source and the valve spindle 238 is screwed out of and removed from the tube 230. It will be seen that now the interior of the tube 230 forms a wide-mouth passageway leading from the rear of the dispensing unit directly into the storage chamber 246 and unobstructed except for the sleeve 258, the head 260 and the webs 266 (as well as the webs holding the hub 267 in position). However these obstructions are negligible and easily permit the secondary liquid to be poured into the storage chamber. This advantage is secured because the intermediate part of the outlet chamber includes a portion of the now removed valve spindle.

It will be observed that the passageway forming the first port 232 slopes radially and rearwardly away from the interior of the tube 230 so that as secondary liquid runs through said tube into the storage chamber it will not tend to run back into the hollow handle 222.

It is commercially desirable to have the flow of primary liquid cut off at the two extreme positions of the valve spindle, as in the case of the dispensing unit 20. This can be accomplished with an axially shiftable spindle by use of a construction such as shown in the dispensing unit 300 illustrated in FIGS. 16–18 and the operation of which is clear from inspection of the graph in FIG. 19.

The dispensing unit 300 includes a hollow handle 302 having a hose coupling located at its admission end. Said handle is molded of a high impact synthetic resin and is integral with a skirt 304 constituting the rear half of a secondary liquid storage chamber 306, the front half of which is formed by a ferrule 308 unitarily joined to the skirt. The rear end of a light-walled aluminum outflow tubing 310 is disposed within said storage chamber. A partition 312 constituting the front of chamber 306 has a central aperture 314 to pass said outflow tubing, there being an O-ring 316 at the opening 314 to seal secondary liquid within the storage chamber. The seal is retained by a keeper plate 318.

The rear end of the skirt 304 terminates at a transverse partition 320 which defines the back wall of the storage chamber and which partition has formed integrally therewith a dual function tubular passageway 322. The first function of the passageway 322 is to serve as the second port, i.e., a port which controllably connects the storage chamber with a primary liquid chamber. The second function of the passageway 322 is to serve as an auxiliary first port, specifically as a port which operates to cut off flow of the primary liquid in a retrograde position of the valve spindle.

The partition 320 is formed with a central opening in which there is disposed a central axial tube 324 constituting the valve cage, said tube being in one piece with the handle 302 and skirt 304. The passageway 322 provided communication between said handle and the interior of the tube. The interior of said tube acts as the first part of the primary liquid inlet chamber. A set of female threads 326 are molded in the tube 324 adjacent the rear end thereof.

A sleeve 328 is provided within the storage chamber, the interior of said sleeve constituting the downstream part of the primary liquid outlet chamber. Said sleeve is formed in one piece with a base flange 330 which is unitarily joined to the skirt 304 by radial webs 332. Accordingly the handle 302, the skirt 304, the rear transverse partition 320, the tube 324 and the webs 332 constitute a single piece of molded plastic material, and the sleeve 328 is secured to the webs 332, as by cementing.

Extending forwardly from the flange 330 is a squat hollow boss 333 on which the rear end of the outflow tubing 310 is freely journalled. An out-turned flange 334 at the rear of the outflow tubing 310 rests against a metal washer 336 received in a groove formed in the front surface of the hub 330. The side of said boss is annularly grooved to seat an O-ring 338 that provides sealing engagement between the boss 333 (the downstream side of the primary liquid outlet chamber) and the storage chamber 306. To aid in holding the outflow tubing in place we provide a collar 340 which encircles said tubing around the boss 333, said collar being held in place by radial spokes 342 connected to a rim 344 which is united to the interior wall of the ferrule 308.

The sleeve 328 is concentrically located within the storage chamber 306 and is disposed concentrically with respect to the longitudinal axis of the outflow tubing 310.

It will be observed that the rear end of the sleeve 328 is closed, as by a bullet nose 346, which defines the rear end of the downstream part of the primary liquid outlet chamber. Just in front of this nose the sleeve 328 is formed with lateral through openings 348 that provides access to the interior of said sleeve. A sealing O-ring 350 is provided around the base of the reduced rear end 352 of the sleeve 328 for a purpose which soon will be apparent.

To control the operation of the dispensing unit we employ a hollow valve spindle 354 having a transverse solid partition 356. Rearwardly of said partition the exterior surface of the valve spindle is formed with male threads 358 that mesh with the female threads 326 so that rotation of the valve spindle will cause axial translation thereof within the tube 324.

Forwardly of the partition 356 the external surface of the valve spindle has provided thereon a pair of O-rings 360, 362 between which there is situated an annular primary liquid passageway 364 which constitutes the intermediate part of the primary liquid inlet chamber. The interior of the valve spindle 354 forwardly of the transverse partition 356 constitutes the downstream part of the primary liquid inlet chamber, being connected to the external annular passageway 364 by openings 366 in the wall of the valve spindle. The valve spindle further includes a second external annular passageway 368 forwardly of the annular passageway 364. The purpose of said second annular passageway will be made clear hereinafter.

Immediately forward of the second annular passageway 368 the valve spindle is enlarged to provide a tubular shell 370 in one piece with said spindle and concentric with the sleeve 328. An internal annular shoulder 372 defines the rear interior wall of the shell. The interior side surface of said shell rides over the O-ring 350 is sealing engagement therewith and prevents communication between the interior of the storage chamber 306 and the interior of the valve spindle 354 forwardly of the partition 356. The space 374 between the interior surface of the shell and the external surface of the bullet nose 346 and reduced rear portion 352 of the sleeve 328 constitutes the upstream part of the primary liquid outlet chamber.

The inner periphery of the annular shoulder 372 defines a circular opening which is concentric with respect to the sleeve 328, is larger than the extreme rear end of the bullet nose 346 and is smaller than the reduced rear section 352 of the sleeve 328. Moreover, the exterior of the bullet nose 346 is a conical symmetrical surface of revolution centered on the longitudinal axis of the sleeve 328. The space between the inner periphery of the shoulder 372 and the outer rearwardly tapering symmetrical surface of the bullet nose 346 constitutes the first port, i.e. the port which in the forward, i.e. initial, position of the valve spindle 354 cuts off the flow of primary liquid between the inlet and outlet chambers.

The valve spindle 354 is manipulated by a knob 376 suitably connected to the said spindle as by adhesive or by autogenous welding so as to be movable therewith.

The relative locations of the first and second ports and the cooperating control valve means are best described by reference to the operation of the dispensing unit 300.

The initial cutoff portion of the said dispensing unit is shown in FIG. 16. In this position the inner periphery of the shoulder 372 is pressed against the bullet nose 346 of the sleeve 328 and provides a liquid tight engagement therewith, it being noted that the material of the valve spindle and of the bullet nose is plastic and therefore somewhat yielding so that under pressure the engaging surfaces will form a sealed joint. This is aided by the fabrication of the dispensing unit 300 from a plastic material such as heretofore indicated, to wit, an elastomeric-modified plastic which, therefore, is sufficiently yielding to provide the desired seal.

In said initial cutoff position the primary liquid is present under pressure in all parts of the primary liquid inlet chamber, these being the handle 302, the passageway 322, the annular passageway 364, the opening 366 and the interior of the spindle 354 upstream of the shoulder 372. The O-ring 360 prevents flow of the primary liquid rearwardly out of the tube 324 and the O-ring 362 prevents communication between the primary liquid inlet chamber and the storage chamber. This initial position of the various parts corresponds to the "off" position of the solid line in the graph illustrated in FIG. 19.

If now the knob 376 is turned counter-clockwise to slightly back off the vale spindle 354 as shown in FIG. 17, a slight opening will be formed at the first port between the inner periphery of the shoulder 372 and the exterior surface of the bullet nose 346. Accordingly, primary liquid now will flow through the various parts of the primary liquid inlet chamber above described, through the first port, into the upstream part 374 of the primary liquid outlet chamber. The primary liquid thereupon will enter the openings 348 to fill the downstream part of the primary liquid outlet chamber, i.e. the interior of the sleeve 328 and thereafter will run out into the outflow tubing 310. By increasing the size of the opening provided by the first port, an increased rate of flow of clear primary liquid is secured for progressive rearward movement of the valve spindle as indicated by the rising solid line of the graph in FIG. 19.

After the valve spindle has moved rearwardly for a distance to provide a substantial opening at the first port, further rearward movement does not noticeably increase the rate of flow of the clear primary liquid as indicated by the dwell in the solid line of the graph in FIG. 19.

At all times the sealing ring 350 prevents communication between the upstream part 374 of the primary liquid outlet chamber and the storage chamber 306 and the sealing ring 362 prevents communication between the storage chamber 306 and the upstream part of the primary liquid inlet chamber constituting the interior of the tube 324 between the O-rings 360, 362.

As the knob 376 is turned further in a counterclockwise direction to back the spindle 354 further, a position ultimately will be reached such as shown in FIG. 18, at which the sealing ring 362 just clears the forward edge of the passageway 322 where it opens into the tube 324 (the second port). This provides communication between the upstream part of the primary liquid inlet chamber (the passageway 364) and the storage chamber 306, the communication being around the periphery of the forward flange 378 which forms the front ridge for the sealing ring 362, as well as through the annular passageway 368. The initial communication is restricted (throttled) by the flange 378; however, further rearward movement of the spindle will provide an increased area of communication at the second port so that as the spindle is moved rearwardly the rate of introduction of the secondary liquid into the primary liquid will increase, this being indicated by the ascending part of the dotted line in the graph of FIG. 19.

Moreover, as the valve spindle moves rearwardly the sealing ring 362 will progressively restrict the flow of the primary liquid through the passageway 322 so that although the first port at the bullet nose 346 is wide open, the auxiliary section of the first port, i.e, the passageway 322, starts to be constricted so as to cut down flow of primary liquid, thus producing the descending part of the solid line curve shown in the graph of FIG. 19. Since the rate of introduction of the secondary liquid is increasing and the rate of flow of the primary liquid is decreasing, high concentrations of the secondary liquid in the primary liquid at slow rates of flow of the primary liquid readily can be obtained.

It will be apparent that initially the passageway 322 forms part of the primary liquid inlet chamber, thereafter it functions as the second port for controlled introduction of the secondary liquid into the primary liquid, subsequently it functions as an auxiliary first port for controlling the flow of the primary liquid, and finally it functions wholly as a first port to completely cut off flow of primary liquid. In other words, when the passageway 322 functions as a first port it operates in conjunction and in series with the first port at the bullet nose 346 and when said passageway 322 functions as a first port all primary liquid spaces downstream thereof are parts of the primary liquid outlet chamber.

In the rearmost operative position of the spindle 354 the sealing ring 362 completely cuts off flow of the primary liquid. At such time the primary liquid communicates through the annular passageway 368 with the storage chamber, however, since the flow of primary liquid is completely blocked off, it has been found that there is no tendency to notably dilute the secondary liquid in the storage chamber at such time.

If the flow of primary liquid is cut off ahead of the dispensing unit 300, the valve spindle 354 may be wholly retracted from the tube 324 and at such time the storage chamber can be filled with secondary liquid by pouring the same through the tube 324.

It thus will be seen that we have provided devices which achieve the several objects of our invention and are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. A dispensing unit comprising a tubular valve cage, a hollow valve spindle rotatable and axially translatable in said valve cage, a first opening leading to the entrance of said valve cage, means supplying a primary liquid under source pressure to said first opening, a second opening connecting the exterior to the interior of said valve spindle, said spindle and said valve cage having open forward ends, a chamber for storing liquid under the average pressure prevailing in the unit, said storage chamber being functionally integral with the valve cage, the forward end of the valve cage being exposed in the storage chamber, a sleeve fixedly mounted within the interior of the storage chamber and concentric with the valve cage, said sleeve having an open forward end, said sleeve being telescopically receivable in sealing relationship within the forward open end of the valve spindle, a portion of the exterior of the valve spindle and a portion of the exterior of the sleeve which extends forwardly from within the valve spindle being exposed to the interior of the storage chamber, an outflow tubing connected to the open forward end of the sleeve and extending through the storage chamber to a point outside the same, the rear end of said sleeve being closed and said sleeve having an aperture located within the spindle, sealing means associated with said cage, spindle and sleeve, the sealing means, cage, spindle, sleeve and openings being so mutually situated that upon axial movement of said spindle, said spindle, cage, sleeve, sealing means and openings operate to control flow of the primary liquid from cut-off to open condition and thereafter while the primary liquid is flowing to control introduction of the secondary liquid into the primary liquid.

2. A dispensing unit as set forth in claim 1 wherein the sealing means, cage, spindle, sleeve and openings are so mutually situated that upon axial movement of the spindle, the spindle, cage, sleeve, sealing means and openings decrease the rate of flow of the primary liquid as the rate of introduction of the secondary liquid increases.

3. A dispensing unit comprising an inlet chamber for primary liquid under source pressure, said inlet chamber having a front wall, means leading primary liquid into said primary liquid inlet chamber, a valve spindle in said primary liquid inlet chamber, means rotatably mounted said valve spindle, a chamber for storing secondary liquid under the average pressure prevailing in the unit, said storage chamber having a rear wall which constitutes a part of the front wall of the primary liquid inlet chamber, a primary liquid outlet chamber within said storage chamber, the rear wall of said primary liquid outlet chamber constituting a part of the front wall of the primary liquid inlet chamber, said primary liquid outlet chamber having an open front end, a first opening in the front wall of the primary liquid inlet chamber communicating between the primary liquid inlet chamber and the primary liquid outlet chamber, a second opening in the front wall of said primary liquid inlet chamber communicating between the primary liquid inlet chamber and the storage chamber, said first and second openings being eccentric to the axis of rotation of the valve spindle, an outflow tubing having the rear end thereof located within the storage chamber and connected to the open front end of the outlet chamber, and a valve member rotatable with the spindle and movable to controllably block the first and second openings so as to control flow of primary liquid through the first opening while the second opening remains closed and thereafter to control introduction of the secondary liquid into the primary liquid through the second opening while reducing rate of flow of the primary liquid through the first opening.

4. A dispensing unit comprising an inlet chamber for primary liquid under source pressure, said inlet chamber having a front wall, means leading primary liquid into said primary liquid inlet chamber, a valve spindle in said primary liquid inlet chamber, means rotatably mounting said valve spindle, a chamber for storing secondary liquid under the average pressure prevailing in the unit, said storage chamber having a rear wall which constitutes a part of the front wall of the primary liquid inlet chamber, a primary liquid outlet chamber within said storage chamber, the rear wall of said primary liquid outlet chamber constituting a part of the front wall of the primary liquid inlet chamber, said primary liquid outlet chamber having an open front end, a first opening in the front wall of the primary liquid inlet chamber communicating between the primary liquid inlet chamber and the primary liquid outlet chamber, a second opening in the front wall of said primary liquid inlet chamber communicating between the primary liquid inlet chamber and the storage chamber, said first and second openings being eccentric to the axis of rotation of the valve spindle, an outflow tubing having the rear end thereof located within the storage chamber and connected to the open front end of the outlet chamber, and a valve member rotatable with the spindle and movable to controllably block the first and second openings so as to control flow of primary liquid through the first opening while the second opening remains closed and thereafter to control introduction of the secondary liquid into the primary liquid through the second opening.

5. A dispensing unit as set forth in claim 4 wherein the outflow tubing extends through a wall of the storage chamber, and wherein the outflow tubing is sealed to the primary liquid outlet chamber and to the storage chamber by sealing members so as to permit rotation of said tubing about its longitudinal axis with respect to the dispensing unit.

6. A dispensing unit comprising a tubular valve cage, a hollow valve spindle rotatable and axially translatable in said valve cage, an inlet chamber for primary liquid under source pressure, said inlet chamber being adjacent the exterior of said valve cage, a first port connecting said primary liquid inlet chamber to the interior of said valve cage, a chamber for storing secondary liquid under the average pressure prevailing in the unit, said storage chamber being in communication with a forward portion of said valve cage, the forward ends of said valve spindle and valve cage being open, a second port connecting the storage chamber to the interior of said valve cage, an opening connecting the exterior to the interior of said spindle, an outflow tubing extending through a wall of the storage chamber and connected to the forward end of the valve cage, and sealing means on said valve spindle and cooperating with said ports to control flow of primary liquid through the first port from cutoff to open condition while the second port remains effectively closed and thereafter to control introduction of the secondary liquid into the primary liquid through the second port.

7. A dispensing unit comprising a tubular valve cage, a hollow valve spindle rotatable and axially translatable in said valve cage, a first opening leading into the interior of said valve cage, means supplying a primary liquid under source pressure to said opening, a second opening connecting the exterior to the interior of said valve spindle, the forward ends of said valve spindle and valve cage being open, a chamber for storing secondary liquid under the average pressure prevailing in the unit, said storage chamber being mounted on the open forward end of said valve cage, a sleeve fixedly mounted in said storage chamber concentrically of the valve cage and spaced forwardly therefrom and telescopically received in the open forward end of the valve spindle, the rear end of the sleeve being closed and having an opening in said sleeve providing communication between the interior of the valve spindle and the interior of the sleeve, the forward end of the sleeve being open, a port in the portion of the valve spindle in which the sleeve is received, outflow tubing extending through a wall of the storage chamber and connected to the open forward end of the sleeve, and sealing means for said valve spindle and sleeve and cooperating with said port and first opening to control flow of primary liquid through the first opening while the port remains effectively closed and thereafter to control introduction of the secondary liquid into the primary liquid through the port.

8. A dispensing unit as set forth in claim 7 wherein the valve cage and valve spindle are interconnected to permit removal of the valve spindle from the valve cage to allow secondary liquid to be poured into the storage chamber through the empty valve cage.

9. A dispensing unit comprising a tubular valve cage, a hollow valve spindle rotatable and axially translatable in said valve cage, a first opening leading to the interior of said valve cage, means supplying a primary liquid under source pressure to said first opening, a second opening connecting the exterior to the interior of said valve spindle, the forward ends of said valve spindle and valve cage being open, a chamber for storing secondary liquid under the average pressure prevailing in the unit, said storage chamber being fixedly mounted on the open forward end of said valve cage, a sleeve mounted in said storage chamber concentrically of the valve cage and spaced forwardly therefrom and telescopically received in the open forward end of the valve spindle, the forward end of the sleeve being open, the rear end of the sleeve being closed and having a lateral opening providing a connection between the interior of the valve spindle and the interior of the sleeve, outflow tubing extending through a wall of the storage chamber and connected to the open forward end of the sleeve, a seat within the valve spindle cooperating with the closed rear end of the sleeve to act as a port controlling flow of the primary liquid, said valve spindle forward of said seat providing a space between the interior surface thereof and the exterior surface of the sleeve around the lateral opening in the sleeve, and sealing means on said valve spindle cooperating with the open forward end of said valve cage to control introduction of the secondary liquid into the primary liquid through the first opening.

10. A dispensing unit as set forth in claim 9 wherein the valve cage and valve spindle are interconnected to permit removal of the valve spindle from the valve cage to allow secondary liquid to be poured into the storage chamber through the empty valve cage.

11. A dispensing unit comprising a tubular valve cage, a hollow valve spindle rotatable and axially translatable in said valve cage, a first opening leading to the interior of said valve cage, means supplying a primary liquid under source pressure to said first opening, a second opening connecting the exterior to the interior of said valve spindle, the forward ends of said valve spindle and valve cage being open, a chamber for storing secondary liquid under the average pressure prevailing in the unit, said storage chamber being fixedly mounted on the open forward end of said valve cage, a sleeve mounted in said storage chamber concentrically of the valve cage and spaced forwardly therefrom and telescopically received in the open forward end of the valve spindle, the forward end of the sleeve being open, the rear end of the sleeve being closed and having a lateral opening providing a connection between the interior of the valve spindle and the interior of the sleeve, outflow tubing extending through a wall of the storage chamber and connected to the open forward end of the sleeve, and sealing means on said valve spindle cooperating with the open forward end of said valve cage to control introduction of the secondary liquid into the primary liquid through the first opening.

12. A dispensing unit comprising an inlet chamber for primary liquid under source pressure, an outlet chamber for primary liquid, a chamber for storing secondary liquid under the average pressure prevailing in the unit, said storage chamber being structurally integral with said inlet chamber, and a single valve, said valve including a cage member and a spindle member rotatable in the cage member, one of said members having a helical thread and an element on the other of said members meshing with the thread so that turning of the spindle member within the cage member will cause axial movement of the spindle member within the cage member, said members and said chambers having cooperating ports and sealing rings so related that responsive to such axial movement they variably control the flow of primary liquid from the inlet chamber to the outlet chamber between full flow and cut-off and variably control the introduction of the secondary liquid through a singular opening into the primary liquid while the primary liquid is flowing.

13. A dispensing unit as set forth in claim 12 wherein the element on the other member is a helical thread matching the helical thread on the one member.

14. A dispensing unit as set forth in claim 12 wherein the ports and sealing rings of the valve members and chambers are so related as to maintain flow of primary liquid at substantially full rate while varying the introduction of the secondary liquid into the primary liquid.

15. A dispensing unit as set forth in claim 12 wherein the ports and sealing rings of the valve members and chambers are so related as to inversely vary flow of primary liquid and the introduction of the secondary liquid into the primary liquid so as to obtain high concentration of secondary liquid in the primary liquid at slow rates of flow of the primary liquid.

16. A dispensing unit as set forth in claim 12 wherein the ports and sealing rings of the valve members and chambers are so related as to control flow of primary liquid from cut-off to open condition to cut-off as the spindle axially moves in the same direction.

17. A dispensing unit as set forth in claim 12 wherein the inlet chamber, the outlet chamber and the valve form a passageway for primary liquid in which passageway there is a broad discontinuity communicating with the storage chamber, wherein the spindle member bridges the discontinuity in said passageway, and wherein the spindle member is readily removable from the unit to leave an opening on the exterior of the unit which opening is in communication through the cage member with said discontinuity whereby upon removal of said spindle member secondary liquid may be poured into said opening to pass through the cage member and discontinuity into the storage chamber.

18. A dispensing unit comprising an inlet chamber for primary liquid under source pressure, an outlet chamber for primary liquid, a chamber for storing secondary liquid under the average pressure prevailing in the unit, said storage chamber being structurally integral with said inlet chamber, and a single valve interconnecting the three chambers and configured to variably control the flow of primary liquid from the inlet chamber to the outlet chamber between full flow and cut-off and to inversely vary the introduction of the secondary liquid through a singular opening into the primary liquid while the primary liquid is flowing so as to obtain high concentration of secondary liquid in the primary liquid at slow rates of flow of the primary liquid.

19. A dispensing unit comprising an inlet chamber for primary liquid under source pressure, an outlet chamber for primary liquid, a chamber for storing secondary liquid under the average pressure prevailing in the unit, said storage chamber being structurally integral with said inlet chamber, and a single valve interconnecting the three chambers and configured to variably control the flow of primary liquid from the inlet chamber to the outlet chamber between full flow and cut-off and to variably control the introduction of the secondary liquid through a singular opening into the primary liquid while the primary liquid is flowing, said inlet and outlet chambers and said valve forming a passageway for primary liquid in which passageway there is a broad discontinuity communicating with the storage chamber, the valve including a spindle bridging the discontinuity in said passageway, said spindle being mounted in said valve so as to be readily removable from the unit to leave an opening on the exterior of the unit which opening is in communication with the discontinuity whereby upon removal of said spindle secondary liquid may be poured through said opening to pass through the discontinuity into the storage chamber.

20. A dispensing unit as set forth in claim 19 wherein the inlet chamber includes the discontinuity.

21. A dispensing unit as set forth in claim 19 wherein the outlet chamber includes the discontinuity.

22. A dispensing unit as set forth in claim 19 wherein the inlet chamber in part includes the valve and wherein removal of the spindle leaves the discontinuity.

23. A dispensing unit as set forth in claim 19 wherein the outlet chamber in part includes the valve and wherein removal of the spindle leaves the discontinuity.

24. A dispensing unit comprising an inlet chamber for primary liquid under source pressure, an outlet chamber for primary liquid, a chamber for storing secondary liquid under the average pressure prevailing in the unit, said storage chamber being structurally integral with said inlet chamber, and a single valve interconnecting the three chambers and configured to variably control the flow of primary liquid from the inlet chamber to the outlet chamber between full flow and cut-off and to variably control the introduction of the secondary liquid through a singular opening into the primary liquid while the primary liquid is flowing, the outlet chamber being located within the storage chamber, the upstream end of the outlet chamber being closed and being provided with a lateral opening for passage of the primary liquid, the valve including a hollow tube telescoped onto the outlet chamber and a cage in which the tube is mounted for translation and for ready removal from the unit, said unit having a discontinuity within the storage chamber between the valve cage and the outlet chamber, said valve tube bridging the discontinuity when telescoped on to the outlet chamber, whereby upon removal of the tube secondary liquid can be poured through the empty cage and the discontinuity into the storage chamber.

References Cited in the file of this patent

UNITED STATES PATENTS

| | | |
|---|---|---|
| 1,502,483 | O'Flaherty | July 22, 1924 |
| 2,014,639 | Stumm | Sept. 17, 1935 |
| 2,243,275 | Ewan | May 27, 1941 |
| 2,717,176 | Osrow | Sept. 6, 1955 |
| 2,795,460 | Bletcher | June 11, 1957 |
| 2,797,132 | Alpert | June 25, 1957 |
| 2,829,921 | Osrow | Apr. 8, 1958 |
| 2,908,445 | Schwartz | Oct. 13, 1959 |
| 2,975,804 | Dunn | Mar. 21, 1961 |
| 3,039,492 | Brucker | June 19, 1962 |